(12) United States Patent
Dawson et al.

(10) Patent No.: US 10,436,659 B2
(45) Date of Patent: Oct. 8, 2019

(54) PRESSURE SENSOR DEVICE AND METHOD FOR TESTING THE PRESSURE SENSOR DEVICE

(71) Applicant: FREESCALE SEMICONDUCTOR, INC., Austin, TX (US)

(72) Inventors: Chad Dawson, Queen Creek, AZ (US); Keith Kraver, Gilbert, AZ (US); Shiraz Contractor, Phoenix, AZ (US)

(73) Assignee: NXP USA, Inc., Austin, TX (US)

( * ) Notice: Subject to any disclaimer, the term of this patent is extended or adjusted under 35 U.S.C. 154(b) by 167 days.

(21) Appl. No.: 15/144,985

(22) Filed: May 3, 2016

(65) Prior Publication Data

US 2017/0322098 A1    Nov. 9, 2017

(51) Int. Cl.
*G01L 9/00* (2006.01)
*G01L 27/00* (2006.01)

(52) U.S. Cl.
CPC .......... *G01L 9/0072* (2013.01); *G01L 27/007* (2013.01)

(58) Field of Classification Search
CPC .......................... G01L 9/0072; G01L 27/007
USPC ........................................................ 73/1.57
See application file for complete search history.

(56) References Cited

U.S. PATENT DOCUMENTS

| | | |
|---|---|---|
| 7,210,337 B1 | 5/2007 | Jarrett |
| 7,673,519 B1 | 3/2010 | Fuhrmann et al. |
| 7,918,135 B2 | 4/2011 | Hammerschmidt |
| 9,791,340 B2 | 10/2017 | Bilic et al. |
| 2008/0103705 A1* | 5/2008 | Hammerschmidt ... G08C 25/00 702/57 |
| 2011/0146410 A1 | 6/2011 | Hammerschmidt |
| 2017/0023429 A1* | 1/2017 | Straeussnigg ......... H03M 3/336 |

OTHER PUBLICATIONS

Infineon, "Innovative Semiconductor Solutions for Energy Efficiency, Mobility and Security", Pressure Sensor in Automotive Applications, Infineon Techologies, Jun. 26, 2012, pp. 1-18.

* cited by examiner

*Primary Examiner* — John Fitzgerald
*Assistant Examiner* — Rodney T Frank
(74) *Attorney, Agent, or Firm* — Daniel D. Hill

(57) ABSTRACT

A pressure sensor device and a method for testing the pressure sensor device is provided. The pressure sensor device includes a first pressure sensor cell having a first capacitance value, and a second pressure sensor cell having a second capacitance value, the second capacitance value being different from the first capacitance value. In one embodiment, the method includes determining a temperature coefficient offset to test for faults in the pressure sensor device. In another embodiment, the method includes determining a differential mode calculation and a common mode calculation. A fault exists if the differential and common mode calculations do not agree.

20 Claims, 7 Drawing Sheets

PRESSURE SENSOR DEVICE AND METHOD FOR TESTING THE PRESSURE SENSOR DEVICE

BACKGROUND

Field

This disclosure relates generally to pressure sensors and more specifically to a pressure sensor device and method for testing the pressure sensor device.

Related Art

Micro-electro-mechanical systems (MEMS) is a technology used to make very small mechanical devices using integrated circuit processing technology. To indicate a relatively accurate pressure, pressure sensors first need to be calibrated using a known reference. Pressure sensors can be damaged during use in the field causing them to malfunction. Even if the pressure sensor is not damaged, it can lose calibration. Loss of calibration may result in erroneous pressure indications and cause overall system failure. Self-diagnostic testing can be used to detect if a sensor malfunctions or loses its calibration. Generally, a self-diagnostic test relies on two sense cells that are perfectly matched to each other. However, it is difficult to match sense cells due to, for example, process variation on the MEMS sensor, wire bond parasitic capacitances, etc. that may reduce accuracy of the test.

Therefore, a need exists for a method to test a MEMS pressure sensor that solves the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
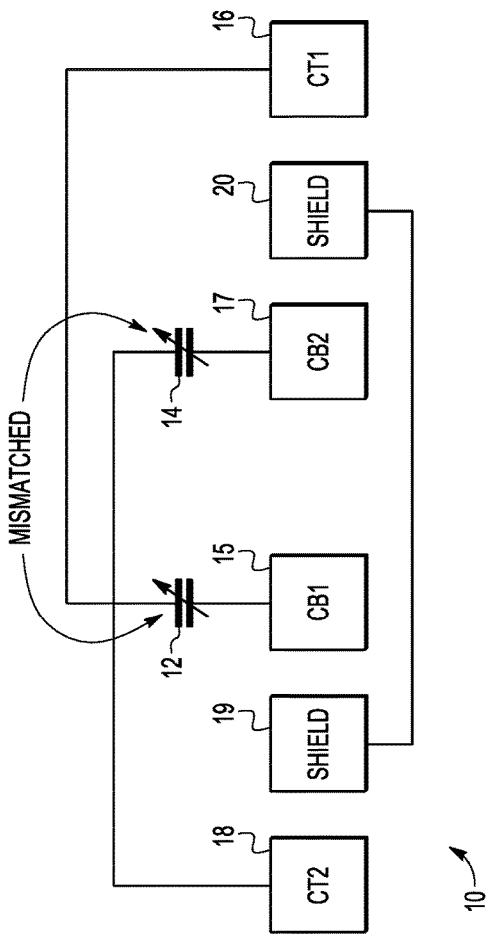
FIG. 1 illustrates, in schematic diagram form, a pressure sensor device in accordance with an embodiment.

Generally, there is provided, a pressure sensor device and a method for testing a pressure sensor. The pressure sensor device is a MEMS device implemented on a silicon die. The pressure sensor device includes two capacitive pressure sensors. Instead of being matched to have the same capacitance value for each pressure measurement, the two capacitive pressure sensors are intentionally mismatched to provide different capacitances. One way the capacitive pressure sensors may be mismatched is by forming one to be a different size than the other. For example, the pressure sensors may be identical except that one has a different width than the other. Intentionally mismatching the sense cells avoids at least some of the problems associated with testing pressure sensors having matched cells.

The sensors can fail in various ways. One way for the sensor to fail is a hermeticity breach where a crack develops in the device that allows air into the cavity. This decreases capacitance of the sense cells. Another way a device can fail is called a parasitic shift, where wire bonds on the device shift causing a change in the parasitic capacitance. Either type of fault can happen to either sense cell on the device.

Two embodiments are disclosed, in a first embodiment, a method for testing the pressure sensor device is based on a temperature coefficient offset (TCO) sensitivity. In a second embodiment, a method for testing is based on a comparison of common mode and differential mode measurements. Both measurements are calibrated such that a matched output is provided under normal circumstances, but become mismatched when the pressure sensor malfunctions. Even though the cells are mismatched, there is a consistent known relationship between the sensed capacitances, which allows the common mode and differential mode measurements to be compared.

In one embodiment, there is provided, a method for testing a pressure sensor device comprising a first pressure sensor and a second pressure sensor, the first and second pressure sensors being mismatched with respect to each other, the method comprising: determining a first capacitance relationship between the first and second pressure sensors and first and second reference capacitors; determining a second capacitance relationship between the first and second pressure sensors and the first and second reference capacitors; determining a fault detection signal based on a difference between the first and second capacitance relationships; detecting that the difference is outside a predetermined limit; and indicating that the pressure sensor device has failed. The mismatch may comprise the first pressure sensor being more sensitive to pressure changes than the second pressure sensor. Determining a first capacitance relationship may further comprise determining a difference capacitance using the first and second pressure sensors the first and second reference capacitors. The second capacitance relationship may further comprise determining a common mode capacitance using the first and second pressure sensors and the first and second reference capacitors. The method for testing may be characterized as being a self-diagnostic test. The first capacitance relationship may further comprise determining a first temperature coefficient and the second capacitance relationship further comprises determining a second temperature coefficient. The mismatch may comprise the first pressure sensor having a dimension that is larger than a corresponding dimension of the second pressure sensor.

In another embodiment, there is provided, a method for testing a pressure sensor device comprising a first pressure sensor and a second pressure sensor, the first and second pressure sensors being mismatched with respect to each other, the method comprising: determining a first relationship using the first and second pressure sensors and first and second reference capacitors; detecting that the first relationship is outside a predetermined limit; and indicating that the pressure sensor device has failed. Determining a first relationship may further comprise determining a temperature coefficient offset between the first and second pressure sensors. Determining a temperature coefficient offset may further comprise: determining a first offset at a first temperature; determining a second offset at a second temperature different than the first temperature; and calculating the temperature coefficient offset using the first and second offsets. The first and second offsets may be determined during manufacture of the pressure sensor device. The method may further comprise determining a second relationship between the first and second pressure sensors, wherein the step of detecting further comprises detecting that a difference between the first relationship and the second relationship is outside a predetermined limit. The first relationship may be characterized as being a capacitance difference and the second relationship may be characterized as being a common mode capacitance. The method may be a self-diagnostic method for testing. The first and second reference capacitors may be matched with respect to each other.

In yet another embodiment, there is provided, a pressure sensor device, comprising: a first pressure sensor cell having a first capacitance value; and a second pressure sensor cell having a second capacitance value, the second capacitance value being different from the first capacitance value. The first and second pressure sensor cells may be micro-electromechanical systems (MEMS) cells. The first pressure sensor may have a dimension that is different from a corresponding dimension of the second pressure sensor. The first and second pressure sensor cells may be implemented on an integrated circuit device. The pressure sensor device may further comprise first and second reference capacitors, the first and second reference capacitors may be substantially matched with respect to each other.

FIG. 1 illustrates, in schematic diagram form, pressure sensor device 10 in accordance with an embodiment. Pressure sensor device 10 includes capacitive pressure sensors 12 and 14. In the illustrated embodiment, pressure sensors are implemented using a conventional MEMS technology. Capacitive pressure sensor 12 has a first plate electrode connected to a pad 15 labeled "CB1," and a second plate electrode connected to a pad 16 labeled "CT1." Capacitive pressure sensor 14 has a first plate electrode connected to pad 18 labeled "CT2," and a second plate electrode connected to a pad 17 labeled "CB2." Shielding pads 19 and 20 are connected together. Pads 15-20 are used to make electrical connections between sensors 12 and 14 and other circuits using, for example, wire bonds or solder balls.

Pressure sensors 12 and 14 are designed to have at least one dimension or other parameter that is different from that of the other sensor so that the sensors are mismatched and provide different capacitance values in response to being exposed to the same pressure. For example, if one of the plate electrodes of each pressure sensor has a length and a width, one of either the length or the width may be intentionally different between the two sensors to cause a capacitance mismatch. For example, pressure sensor 12 may have a width equal to about 81 microns while pressure sensor 14 may have a width equal to 77 micron. The 77 micron sense cell is about 25 percent less sensitive to pressure than the 81 micron sense cell. Even though pressure sensors 12 and 14 are mismatched, there is a consistent known relationship between the capacitances of pressure sensors 12 and 14. The known relationship is exploited in the disclosed embodiments to provide a failure indication when the known relationship is violated.

Figure 2:
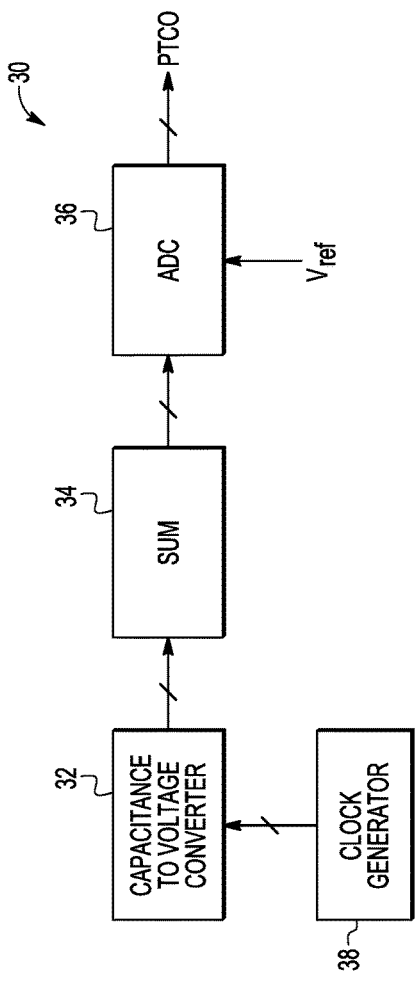
FIG. 2 illustrates, in block diagram form, one embodiment of a signal processing device for testing the pressure sensor device of FIG. 1.

FIG. 2 illustrates, in simplified block diagram form, one embodiment of a signal processing device 30 for testing the pressure sensor device of FIG. 1. Signal processing device 30 includes capacitance-to-voltage converter (CVC) 32, summation circuit 34, analog-to-digital converter (ADC) 36, and clock generator 38. Capacitance-to-voltage converter 32 has a clock input for receiving clock signals from clock signal generator 38, and an output. Summation circuit 34 has an input connected to the output of CVC 32, and an output. Analog-to-digital converter 36 has an input connected to the output of CVC 32, a reference voltage input for receiving a reference voltage labeled "VREF," and an output labeled "PTCO." In one embodiment, signal processing device 30 may be an application specific integrated circuit (ASIC) separate from pressure sensor device 10. In another embodiment, they may both be on the same integrated circuit.

Capacitance-to-voltage converter 32 receives capacitance values from pressure sensors 12 and 14 and converts the capacitance values to voltages. The voltages are provided to summation circuit 34. Summation circuit 34 combines the voltages in accordance with a predetermined algorithm that will be discussed below. The result of the combination is provided to ADC 36.

Figure 3:
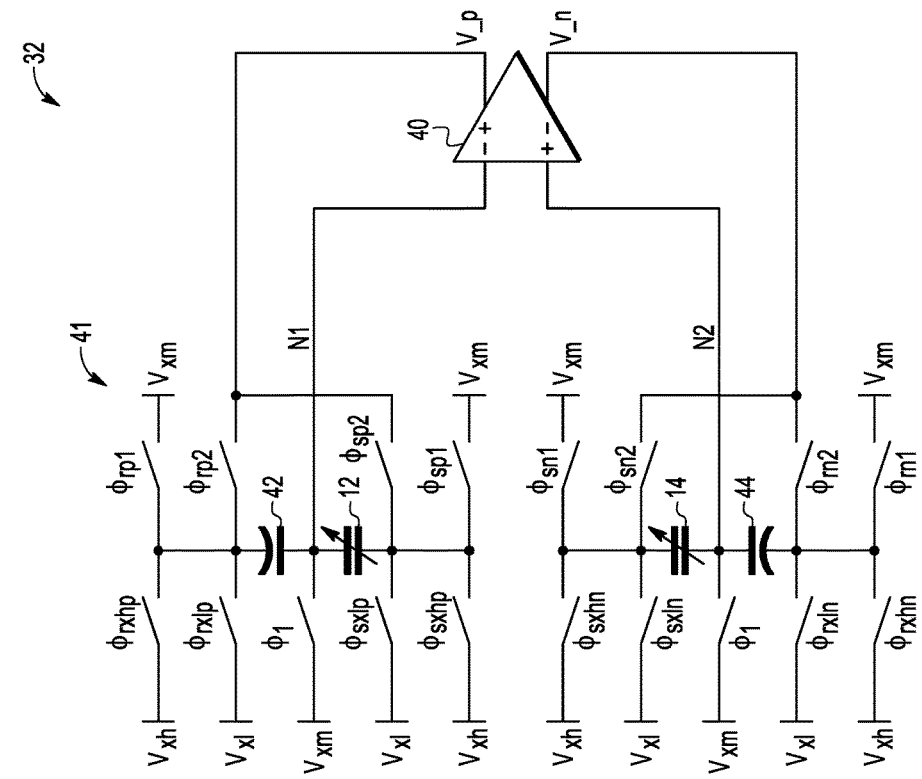
FIG. 3 illustrates, in schematic diagram form, a capacitance-to-voltage converter.

FIG. 3 illustrates, in schematic diagram form, CVC 32 in more detail. Shown in FIG. 3 are capacitive pressure sensors 12 and 14 from FIG. 1, reference capacitors 42 and 44, a plurality of switches 41 and amplifier 40. Reference capacitors 42 and 44 can be implemented on pressure sensor device 10 or on signal processing device 30. Unlike sensors 12 and 14, reference capacitors 42 and 44 are matched with respect to each other. In another embodiment, reference capacitors 42 and 44 may be mismatched. Reference capacitors 42 and 44 are not sensitive to pressure. Amplifier 40 has a negative input connected to an input node labeled N1, a positive input connected to an input node labeled "N2," a positive output labeled "V_p," and a negative output labeled "V_n." A plurality of voltages is provided to an input of the switches. The plurality of voltages include a low voltage labeled "VXL," a medium voltage labeled "VXM," and a high voltage labeled "VXH." The medium voltage VXM has a voltage magnitude between the magnitudes of low voltage VXL and high voltage VXH. The plurality of switches 41 is provided for selectively coupling the various reference voltages to capacitors 12, 14, 42, and 44 and to inputs of amplifier 40 in response to clock signals from clock generator 38.

Figure 4:
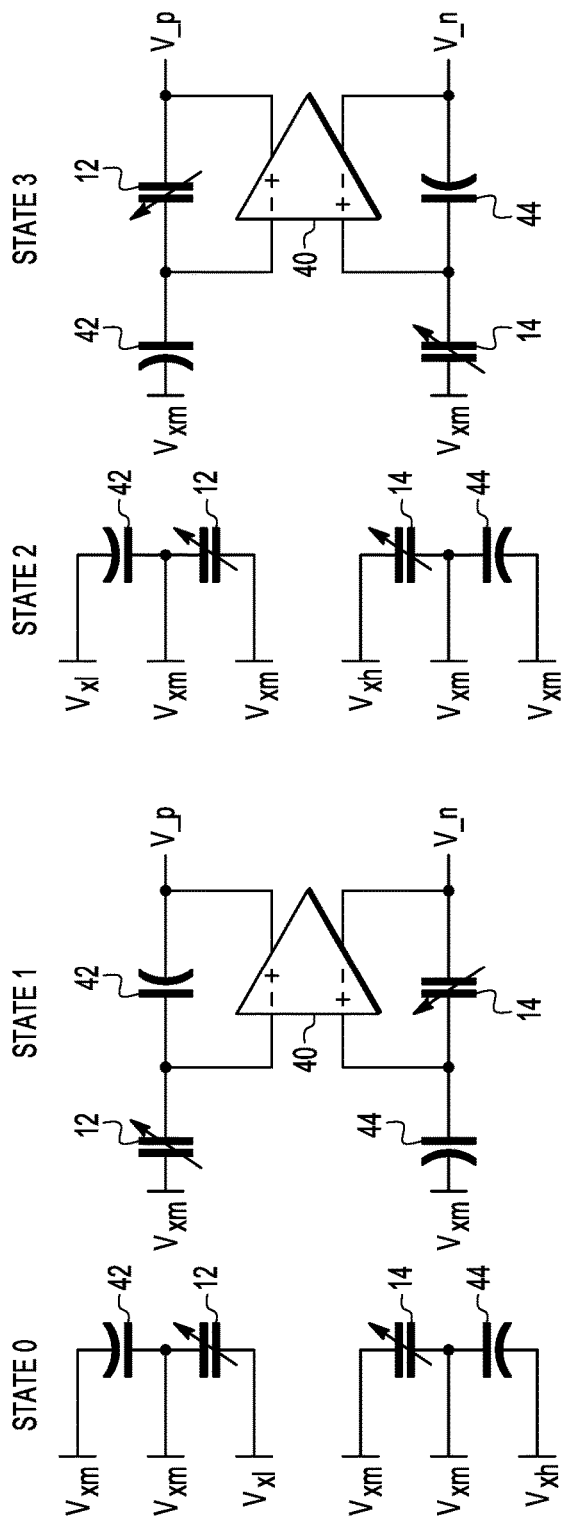
FIG. 4 illustrates phases of operation of the capacitance-to-voltage converter of FIG. 3 for testing the pressure sensor device of FIG. 1 in accordance with a first embodiment.

FIG. 4 illustrates phases of operation of the capacitance-to-voltage converter of FIG. 3 for testing the pressure sensor device of FIG. 1 in accordance with a first embodiment. In the first embodiment, a temperature coefficient offset (TCO) is calculated to test for a malfunction of pressure sensor device 10. The PTCO is calculated by first determining a first offset at a first temperature and a second offset at a second temperature and calculating a single PTCO based on the relationship between the two offsets. A PTCO calculation includes adding a first voltage function V(+TCA) to a second voltage function V(+TCB) using the signal processing device 30. The equation for PTCO is:

$$PTCO = \frac{2V_X}{V_{REF}} \left( \frac{C_{12} + C_{44}}{C_{14} + C_{42}} - \frac{C_{14} + C_{42}}{C_{12} + C_{44}} \right)$$

where VX is an average of an absolute value of a difference between VXH and VXM and an absolute value of a difference between VXM and VXL, C12 and C14 represent the capacitance of pressure sensors 12 and 14, respectively, and C42 and C44 represent the capacitance of reference capacitors 42 and 44, respectively.

In CVC 32, the PTCO is determined in four states, states 0-3, using two voltage functions separated by reset functions. The first voltage function V(+TCA) is proportional to $$\frac{C_{12} + C_{44}}{C_{14} + C_{42}}$$

and is determined by closing the plurality of switches 41 so that CVC 32 is as depicted on the left side of FIG. 4. Likewise, the second voltage function V(+TCB) is proportional to $$\frac{C_{14} + C_{42}}{C_{12} + C_{44}}$$

and is determined by closing the plurality of switches 41 so that CVC 32 is as depicted on the right side of FIG. 4.

Figure 5:
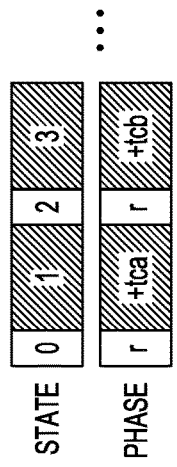
FIG. 5 illustrates a timing diagram of the phases of operation for testing the pressure sensor device of FIG. 1 in accordance with the first embodiment.

FIG. 5 illustrates a timing diagram of the four states of PTCO calculation shown above in FIG. 4. After the V(+TCA) and V(+TCB) determination by CVC 32, a summation operation is performed by summation circuit 34 to determine a difference between V(+TCA) and V(+TCB). The summation operation is performed in phases as shown in FIG. 4 and FIG. 5. In a state 0, a reset phase initializes CVC 32 to an initial condition. At state 1, voltage V(+TCA) is provided from CVC 32 to the input of summation circuit 34. At state 2, another reset phase initializes CVC 32. At state 3, the voltage V(+TCB) is subtracted from V(+TCA). The operation is repeated in subsequent phases.

Figure 6:
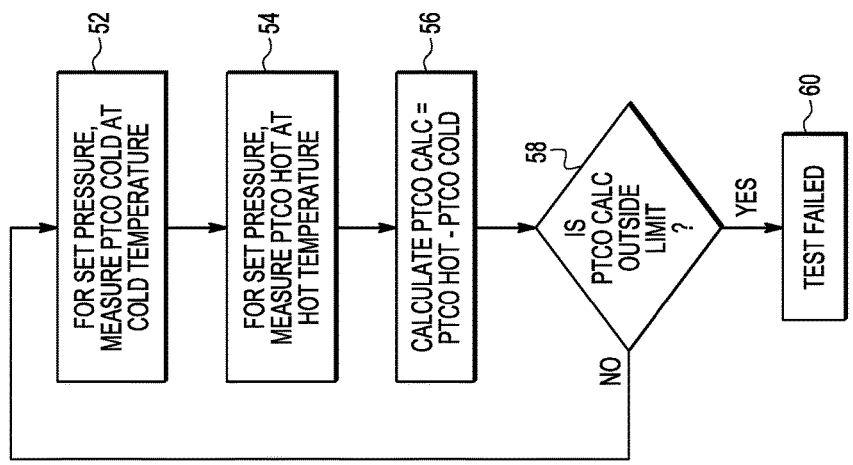
FIG. 6 illustrates a flowchart of a method for testing the pressure sensor device in accordance with the embodiment of FIGS. 3-5.

FIG. 6 illustrates a flowchart of method 50 for testing the pressure sensor device in accordance with the embodiment of FIGS. 3-5. At a predetermined pressure, pressure sensors 12 and 14 are sensitive to changes in temperature. For a correctly functioning sensor 10, the capacitance values provided by both sensors 12 and 14 will change according to a known consistent relationship. When one of sensors 12 and 14 is damaged and cell integrity is lost, the known relationship changes. The PTCO calculation uses sensitivity to temperature to determine if the known relationship has changed. For testing purposes, a PTCO limit is determined. At step 52, for a predetermined set pressure, for example, 100 kilo Pascal (kPa), a PTCO COLD calculation is accomplished for a first predetermined temperature, for example, a cold temperature of −20 degrees Celsius. The PTCO COLD calculation uses the equations and operation discussed above in FIG. 4. The PTCO COLD calculation results are stored.

At step 54, for the predetermined set pressure of 100 kPa, a PTCO HOT calculation is accomplished for second predetermined temperature, for example, a relatively hot temperature of 85 degrees Celsius and the results stored. The PTCO HOT calculation uses the same equations as discussed above and shown in FIG. 4. At step 56, a PTCO calculation value PTCO CALC=PTCO HOT−PTCO COLD is calculated. At decision step 58, it is determined if the PTCO CALC value is outside the predetermined limit. If PTCO CALC is not outside the limit, then the sensor has not malfunctioned and the NO path is taken back to step 52. Steps 52, 54, 56, and 58 may repeat if necessary. If the PTCO CALC value is outside the limit, then the sensor has malfunctioned, possibly due to a crack. The YES path is taken to step 60 and the test failed. In one embodiment, a test failure indication may be provided.

Figure 7:
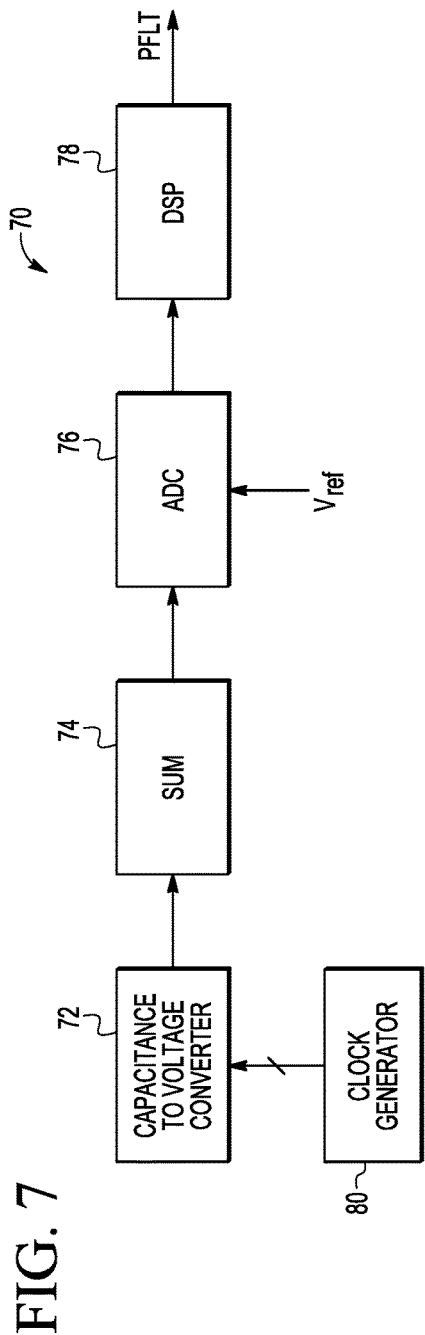
FIG. 7 illustrates another embodiment of a signal processing device for testing the pressure sensor device of FIG. 1.

FIG. 7 illustrates a second embodiment of signal processing device 70 for testing pressure sensor device 10 of FIG. 1. Signal processing device 70 includes capacitance-to-voltage converter (CVC) 72, summation circuit 74, analog-to-digital converter (ADC) 76, digital signal processor (DSP) 78, and clock generator 80. Capacitance-to-voltage converter 72 has a clock input for receiving clock signals from clock signal generator 80, and an output. In one embodiment, CVC 72 is the same as CVC 32 illustrated in FIG. 3. Summation circuit 74 has an input connected to the output of CVC 72, and an output. Analog-to-digital converter 76 has an input connected to the output of CVC 72, a reference voltage input for receiving a reference voltage labeled "VREF," and an output. Digital signal processor 78 has an input connected to the output of ADC 76, and an output for providing a failure indication labeled "PFLT." In one embodiment, signal processing device 70 may be an application specific integrated circuit (ASIC) separate from pressure sensor device 10. In another embodiment, they may both be on the same integrated circuit. The failure indication is determined by first applying a differential pressure calculation and then applying a common mode pressure calculation. A combination of the two pressure calculations provides the PFLT failure indication. The differential mode pressure calculation provides relatively high sensitivity to pressure. The common mode pressure calculation provides relatively low sensitivity to pressure and relatively high sensitivity to fault conditions.

Ideally with balanced pressure sensors, a common mode signal would be constant at all conditions as long as no fault is present. Therefore, a tight limit can be put on the common mode signal to identify faults. With actual pressure sensors, there will always be some imbalance between the pressure sensors. The common mode signal may not be constant or even monotonic. In this case, the limits applied to the common mode signal must be wider. In accordance with the second embodiment, by adding some imbalance between the two pressure sensors, the common mode signal can be made to be monotonic. This allows the common mode signal to be calibrated using the same procedure as the differential mode signal, thus removing the effects of process variation and mismatch and allowing a tight limit on the common mode signal.

Figure 8:
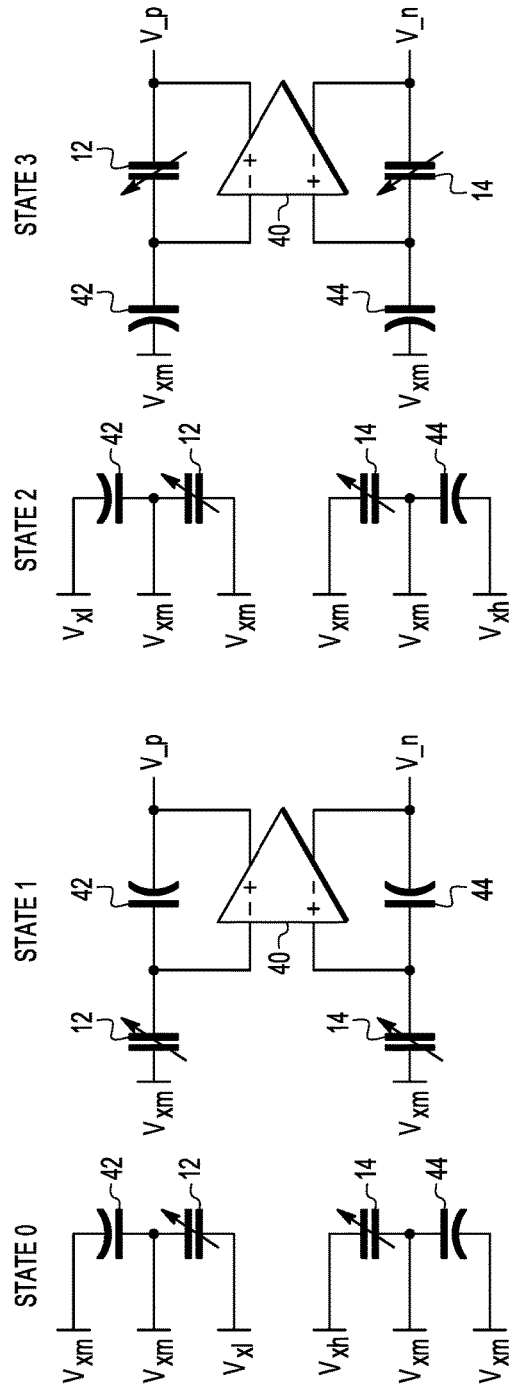
FIG. 8 illustrates phases of operation of the capacitance-to-voltage converter of FIG. 3 for testing the pressure sensor device of FIG. 1 in accordance with a second embodiment.
Figure 9:
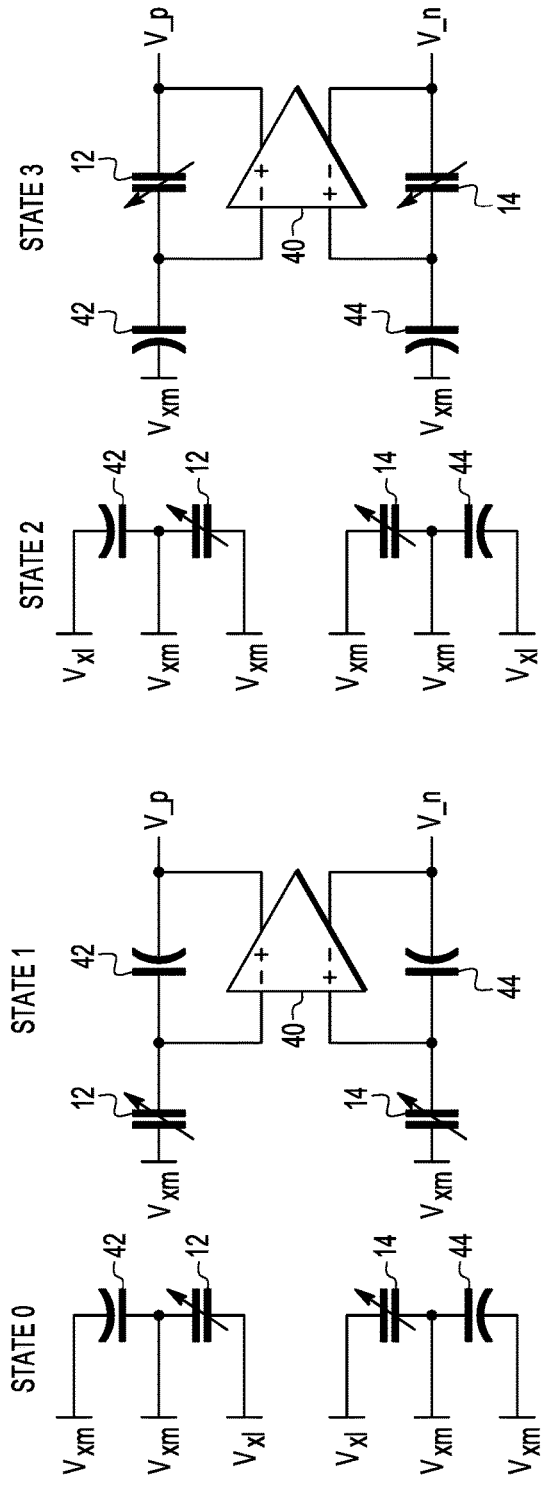
FIG. 9 illustrates phases of operation of the capacitance-to-voltage converter of FIG. 3 for testing the pressure sensor device of FIG. 1 in accordance with the second embodiment.

FIG. 8 illustrates capacitance-voltage circuit configurations of CVC 72 for the differential phase of operation for testing the pressure sensor device of FIG. 1 in accordance with a second embodiment. As stated above, CVC 72 is implemented using CVC 32 of FIG. 3. In accordance with the second embodiment, there is a differential mode calculation (FIG. 8) and a common mode calculation (FIG. 9). The differential mode calculation and common mode calculation undergo further processing in DSP 78, after which, if the two calculations agree there are no faults. When there are faults, the calculations disagree. The differential mode calculation after ADC 76 is:

$$PDIFF = \frac{2V_X}{V_{REF}} \left( \frac{C_{12}+C_{14}}{C_{42}+C_{44}} - \frac{C_{42}+C_{44}}{C_{12}+C_{14}} \right)$$

where VX is an average of an absolute value of a difference between VXH and VXM and an absolute value of a difference between VXM and VXL, C12 and C14 represent the capacitance of pressure sensors 12 and 14, respectively, and C42 and C44 represent the capacitance of reference capacitors 42 and 44, respectively. In CVC 32, a value for PDIFF is determined in four states using two voltage functions (states 1 and 3) separated by two reset states (states 0 and 2). See FIG. 10 for a timing diagram of the four states. A first voltage function V(+DA) is proportional to $$\frac{C_{12}+C_{14}}{C_{42}+C_{44}}$$

and is determined by closing selected ones of the plurality of switches 41 so that CVC 32 is as depicted at state 1 of FIG. 8. Likewise, a second voltage function V(+DB) is proportional to $$\frac{C_{42}+C_{44}}{C_{12}+C_{14}}$$

and is determined by closing selected ones of the plurality of switches 41 so that CVC 32 is as depicted at state 3 of FIG. 8.

FIG. 9 illustrates capacitance-voltage circuit configurations of CVC 72 for the common mode phase of operation for testing the pressure sensor device of FIG. 1 in accordance with the second embodiment. As stated above, CVC 72 is implemented using CVC 32 of FIG. 3. The common mode calculation after ADC 76 is:

$$PCM = \frac{2V_X}{V_{REF}} \left( \frac{C_{12}-C_{14}}{C_{42}+C_{44}} - \frac{C_{42}-C_{44}}{C_{12}+C_{14}} \right)$$

In CVC 32, a value for PCM is determined in four states using two voltage functions separated by reset states. See FIG. 11 for a timing diagram of the four states. A first voltage function V(+CA) is proportional to $$\frac{C_{12}-C_{14}}{C_{42}+C_{44}}$$

and is determined by closing selected ones of the plurality of switches 41 so that CVC 32 is as depicted at the first two states of FIG. 9. Likewise, a second voltage function V(+CB) is proportional to $$\frac{C_{42}-C_{44}}{C_{12}+C_{14}}$$

and is determined by closing selected ones of the plurality of switches 41 so that CVC 32 is as depicted on the last two states of FIG. 9. The result of the differential mode calculation PDIFF and the result of the common mode calculation PCM are subjected to a calibration process. Then the fault detection signal PFLT is equal to the calibrated PDIFF minus the calibrated PCM.

Figure 10:
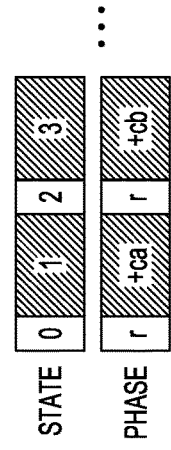
FIG. 10 illustrates a timing diagram of the phases of operation of FIG. 8 for testing the pressure sensor device of FIG. 1 in accordance with the second embodiment.

FIG. 10 illustrates a timing diagram of the two phases of the PDIFF calculation shown above in FIG. 8 for testing the pressure sensor device of FIG. 1 in accordance with the second embodiment. After the V(+DA) and V(+DB) voltage function determination by CVC 32, a summation operation is performed by summation circuit 74 to determine a difference between V(+DA) and V(+DB). The summation operation is performed in phases as shown in FIG. 10. In a state 0, a reset phase initializes CVC 32 to an initial condition. At state 1, voltage V(+DA) is provided from CVC 32 to the input of summation circuit 74. At state 2, another reset phase initializes CVC 32. At state 3, the voltage V(+DB) is subtracted from V(+DA). The operation is repeated in subsequent phases.

Figure 11:
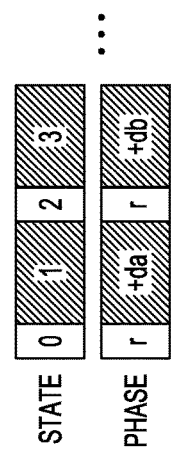
FIG. 11 illustrates a timing diagram of the phases of operation of FIG. 9 for testing the pressure sensor device of FIG. 1 in accordance with the second embodiment.

FIG. 11 illustrates a timing diagram of the two phases of the PCM calculation shown above in FIG. 9 for testing the pressure sensor device of FIG. 1 in accordance with the second embodiment. After the V(+CA) and V(+CB) voltage function determination by CVC 32, a summation operation is performed by summation circuit 74 to determine a difference between V(+CA) and V(+CB). The summation operation is performed in phases as shown in FIG. 11. In a state 0, a reset phase initializes CVC 32 to an initial condition. At state 1, voltage V(+CA) is provided from CVC 32 to the input of summation circuit 74. At state 2, another reset phase initializes CVC 32. At state 3, the voltage V(+CB) is subtracted from V(+CA). The operation is repeated in subsequent phases.

Figure 12:
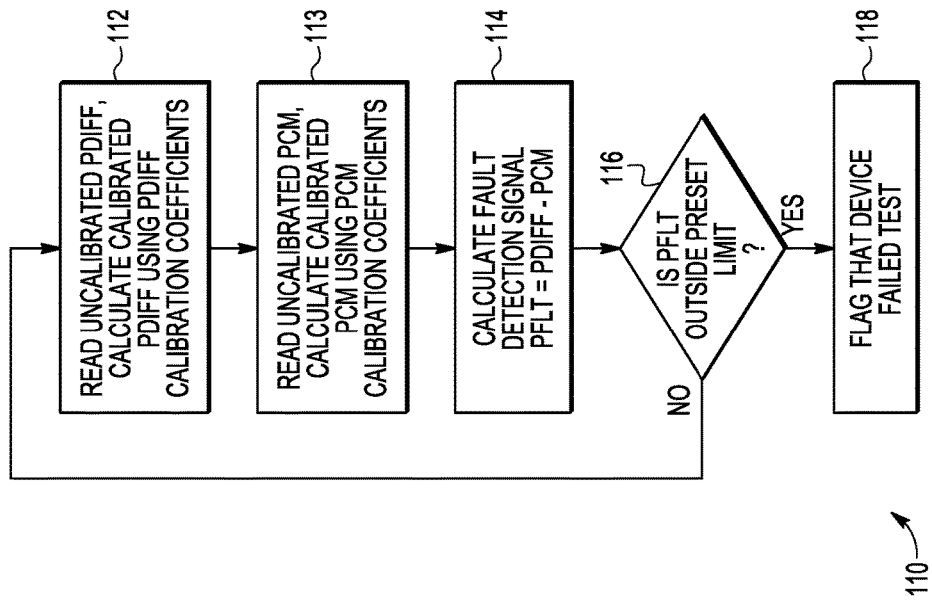
FIG. 12 illustrates a flowchart of a method for determining testing coefficients in accordance with the second embodiment.

FIG. 12 illustrates a flowchart of a method 90 for determining testing coefficients for a pressure sensor device 10 in accordance with the second embodiment. In one embodiment, method 90 is performed during manufacture of the pressure sensor device 10. At step 92, raw sensor output data is read and recorded in differential mode (PDIFF). At step 94, raw sensor data is read and recorded in common mode (PCM). At decision step 96, it is determined if all of the raw sensor data has be read and recorded. If it has, the test flow is complete and the YES path is taken to step 100. If all of the raw sensor data has not been read and recorded, the NO path is taken back to step 92. At step 100, using the recorded raw PDIFF data, PDIFF calibration coefficients are calculated and saved in registers on the same integrated circuit as, or accessible to, signal processing device 70. At step 102, using the recorded raw PCM data, PCM calibration coefficients are calculated and saved in registers. The PDIFF and PCM calibration coefficients will be used later in the method of FIG. 13.

Figure 13:
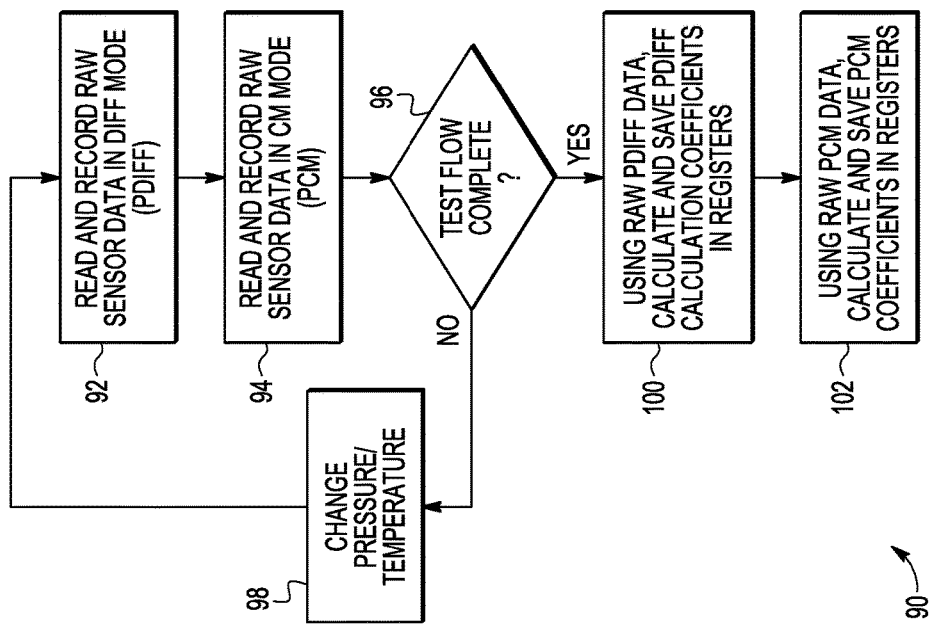
FIG. 13 illustrates a flowchart of a method for testing in accordance with the second embodiment.

FIG. 13 illustrates a flowchart of a method 110 for testing in accordance with the second embodiment. Pressure sensor device 10 includes a diagnostic mode for performing self-tests. At step 112, the uncalibrated PDIFF data and PDIFF calibration coefficients from method 90 of FIG. 12 are used to calculate the calibrated PDIFF. At step 113, the uncalibrated PCM data and PCM calibration coefficients from method 90 of FIG. 12 are used to calculate the calibrated PCM. At step 114, fault detection signal PFLT is calculated from calibrated differential mode result PDIFF minus calibrated common mode result PCM (see the above discussion of FIG. 8 and FIG. 9). At decision step 116, it is determined if PFLT is outside a preset limit. If no, then no fault has been detected and the NO path is taken back to step 112. If fault detection signal PFLT is determined to be output the preset limit, then a fault has been detected and the YES path is taken to step 118. At step 118, an indication, such as a flag, is set indicating that device 10 has failed the test.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for testing a pressure sensor device comprising a first pressure sensor and a second pressure sensor, the method comprising:
    providing the first and second pressure sensors, the first and second pressure sensors having at least one parameter that is different with respect to each other;
    determining, using a signal processing device, a first capacitance relationship between the first and second pressure sensors and first and second reference capacitors;
    determining, using the signal processing device, a second capacitance relationship between the first and second pressure sensors and the first and second reference capacitors;
    determining, using the signal processing device, a fault detection signal based on a difference between the first and second capacitance relationships;
    detecting, using the signal processing device, that the difference is outside a predetermined limit using the fault detection signal; and
    providing the fault detection signal to indicate that the pressure sensor device has failed, wherein the method eliminates the need for the first and second pressure sensors to be matched by using the at least one different parameter to provide a consistent known relationship between the capacitances of the first and second pressure sensors.

2. The method of claim 1, wherein the parameter further comprises the first pressure sensor being more sensitive to pressure changes than the second pressure sensor.

3. The method of claim 1, wherein determining a first capacitance relationship further comprises determining a difference capacitance using the first and second pressure sensors and the first and second reference capacitors.

4. The method of claim 1, wherein the second capacitance relationship further comprises determining a common mode capacitance using the first and second pressure sensors and the first and second reference capacitors.

5. The method of claim 1, wherein the method for testing is characterized as being a self-diagnostic test.

6. The method of claim 1, wherein the first capacitance relationship further comprises determining a first temperature coefficient and the second capacitance relationship further comprises determining a second temperature coefficient.

7. The method of claim 1, wherein the parameter comprises the first pressure sensor having a dimension that is larger than a corresponding dimension of the second pressure sensor.

8. A method for testing a pressure sensor device comprising a first pressure sensor and a second pressure sensor, the method comprising:
    providing the first and second pressure sensors, the first and second pressure sensors having at least one parameter that is different with respect to each other;
    determining, using a signal processing device, a first relationship using the first and second pressure sensors and first and second reference capacitors;
    detecting, using the signal processing device, that the first relationship is outside a predetermined limit; and
    indicating, using the signal processing device, that the pressure sensor device has failed, wherein the method eliminates the need for the first and second pressure sensors to be matched by using the at least one different parameter to provide a consistent known relationship between the capacitances of the first and second pressure sensors.

9. The method of claim 8, wherein determining a first relationship further comprises determining a temperature coefficient offset between the first and second pressure sensors.

10. The method of claim 9, wherein determining a temperature coefficient offset further comprises:
    determining a first offset at a first temperature;
    determining a second offset at a second temperature different than the first temperature; and
    calculating the temperature coefficient offset using the first and second offsets.

11. The method of claim 10, wherein the first and second offsets are determined during manufacture of the pressure sensor device.

12. The method of claim 8, further comprising:
    determining a second relationship between the first and second pressure sensors,
    wherein the step of detecting further comprises detecting that a difference between the first relationship and the second relationship is outside a predetermined limit.

13. The method of claim 12, wherein the first relationship is characterized as being a capacitance difference and the second relationship is characterized as being a common mode capacitance.

14. The method of claim 8, wherein the method for testing is a self-diagnostic method for testing.

15. The method of claim 8, wherein the first and second reference capacitors are matched with respect to each other.

16. A pressure sensor device, comprising:
   a first pressure sensing capacitor having a first capacitance value; and
   a second pressure sensing capacitor having a second capacitance value, wherein at least one parameter of the first pressure sensing capacitor is different from that of the second pressure sensing capacitor so that the second capacitance value is different from the first capacitance value in response to exposure to a same pressure.

17. The pressure sensor device of claim 16, wherein the first and second pressure sensing capacitors are micro-electro-mechanical systems (MEMS) cells.

18. The pressure sensor device of claim 16, wherein the first pressure sensing capacitor has a dimension that is different from a corresponding dimension of the second pressure sensing capacitor.

19. The pressure sensor device of claim 16, wherein the first and second pressure sensing capacitors are implemented on an integrated circuit device.

20. The pressure sensor device of claim 16, further comprising first and second reference capacitors, the first and second reference capacitors are substantially matched with respect to each other.

* * * * *